United States Patent
Sachdev et al.

(10) Patent No.: US 10,866,999 B2
(45) Date of Patent: Dec. 15, 2020

(54) SCALABLE PROCESSING OF QUERIES FOR APPLICANT RANKINGS

(71) Applicant: Microsoft Technology Licensing, LLC, Redmond, WA (US)

(72) Inventors: Sanjay Sachdev, San Jose, CA (US); Arjun K. Kulothungun, San Francisco, CA (US); Jefferson Lai, San Jose, CA (US); Srikant Veera Raghavan, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 403 days.

(21) Appl. No.: 15/874,127

(22) Filed: Jan. 18, 2018

(65) Prior Publication Data

US 2019/0197191 A1   Jun. 27, 2019

Related U.S. Application Data

(60) Provisional application No. 62/610,080, filed on Dec. 22, 2017.

(51) Int. Cl.
| | |
|---|---|
| *G06F 16/9535* | (2019.01) |
| *G06F 16/903* | (2019.01) |
| *G06Q 10/10* | (2012.01) |
| *G06N 20/00* | (2019.01) |

(52) U.S. Cl.
CPC .... *G06F 16/9535* (2019.01); *G06F 16/90335* (2019.01); *G06N 20/00* (2019.01); *G06Q 10/1053* (2013.01)

(58) Field of Classification Search
CPC .......... G06F 16/90335; G06F 16/9535; G06N 20/00; G06Q 10/1053
See application file for complete search history.

(56) References Cited

U.S. PATENT DOCUMENTS

| | | | |
|---|---|---|---|
| 6,272,467 B1 | 8/2001 | Durand et al. | |
| 7,502,748 B1 | 3/2009 | Baldwin et al. | |
| 2004/0163040 A1 | 8/2004 | Hansen | |
| 2005/0080657 A1 | 4/2005 | Crow et al. | |

(Continued)

OTHER PUBLICATIONS

"IBM Terminology "O"", Retrieved from: https://web.archive.org/web/20111003190803/http://www-01.ibm.com/software/globalization/terminology/o.html, Oct. 3, 2011, 48 Pages.

(Continued)

*Primary Examiner* — Scott A. Waldron
(74) *Attorney, Agent, or Firm* — Schwegman Lundberg & Woessner, P.A.

(57) ABSTRACT

The disclosed embodiments provide a system for processing a query for a ranking of candidates for an opportunity. During operation, the system obtains a set of parameters associated with a query for a ranking of candidates for an opportunity, wherein the set of parameters include a candidate, the opportunity, and a ranking category. Next, the system uses the set of parameters to obtain a set of pre-computed scores for use in generating the ranking and determine a number of online scores required to complete the ranking. The system then generates a set of calls to produce the determined number of the online scores. Finally, the system uses the pre-computed scores and the online scores to generate a result of the query.

20 Claims, 5 Drawing Sheets

(56) References Cited

U.S. PATENT DOCUMENTS

| | | |
|---|---|---|
| 2006/0229902 A1 | 10/2006 | Mcgovern et al. |
| 2009/0132345 A1 | 5/2009 | Meyssami et al. |
| 2010/0153288 A1 | 6/2010 | Digiambattista et al. |
| 2010/0274750 A1 | 10/2010 | Oltean et al. |
| 2011/0196801 A1 | 8/2011 | Ellis et al. |
| 2012/0197733 A1 | 8/2012 | Skomoroch et al. |
| 2013/0218991 A1 | 8/2013 | Mcconnell et al. |
| 2014/0122360 A1 | 5/2014 | Rao |
| 2014/0156652 A1* | 6/2014 | Abiola ............... G06Q 10/1053 707/723 |
| 2015/0317610 A1 | 11/2015 | Rao et al. |
| 2016/0127429 A1 | 5/2016 | Singh et al. |
| 2016/0364692 A1 | 12/2016 | Bhaskaran et al. |
| 2018/0060822 A1* | 3/2018 | Hou ................... G06Q 10/1053 |

OTHER PUBLICATIONS

"Final Office Action Issued in U.S. Appl. No. 15/253,596", dated May 21, 2019, 19 Pages.

"Final Office Action Issued in U.S. Appl. No. 15/253,596", dated May 8, 2020, 72 Pages.

"Non Final Office Action Issued in U.S. Appl. No. 15/253,596", dated Nov. 14, 2019, 63 Pages.

"Non Final Office Action Issued in U.S. Appl. No. 15/253,596", dated Nov. 16, 2018, 15 Pages.

* cited by examiner

SCALABLE PROCESSING OF QUERIES FOR APPLICANT RANKINGS

RELATED APPLICATION

This application claims priority under 35 U.S.C. § 119 to U.S. Provisional Application No. 62/610,080, entitled "Efficient Scalable Processing of Queries for Applicant Rankings," by Sanjay Sachdev, Arjun K. Kulothungun, Jefferson Lai and Srikant Veera Raghavan, filed 22 Dec. 2017, the contents of which are herein incorporated by reference in their entirety.

BACKGROUND

Field

The disclosed embodiments relate to techniques for determining applicant competitiveness for jobs. More specifically, the disclosed embodiments relate to techniques for performing efficient, scalable calculation of queries for applicant rankings.

Related Art

Online networks may include nodes representing individuals and/or organizations, along with links between pairs of nodes that represent different types and/or levels of social familiarity between the nodes. For example, two nodes in network may be connected as friends, acquaintances, family members, classmates, and/or professional contacts. Online networks may further be tracked and/or maintained on web-based networking services, such as online professional networks that allow the individuals and/or organizations to establish and maintain professional connections, list work and community experience, endorse and/or recommend one another, run advertising and marketing campaigns, promote products and/or services, and/or search and apply for jobs.

In turn, online networks may facilitate business activities such as sales, marketing, and/or recruiting by the individuals and/or organizations. For example, sales professionals may use an online professional network to locate prospects, maintain a professional image, establish and maintain relationships, and/or engage with other individuals and organizations. Similarly, recruiters may use the online professional network to search for candidates for job opportunities and/or open positions. At the same time, job seekers may use the online professional network to enhance their professional reputations, conduct job searches, reach out to connections for job opportunities, and apply to job listings. Consequently, use of online professional networks may be increased by improving the data and features that can be generated, queried, and/or accessed through the online professional networks.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
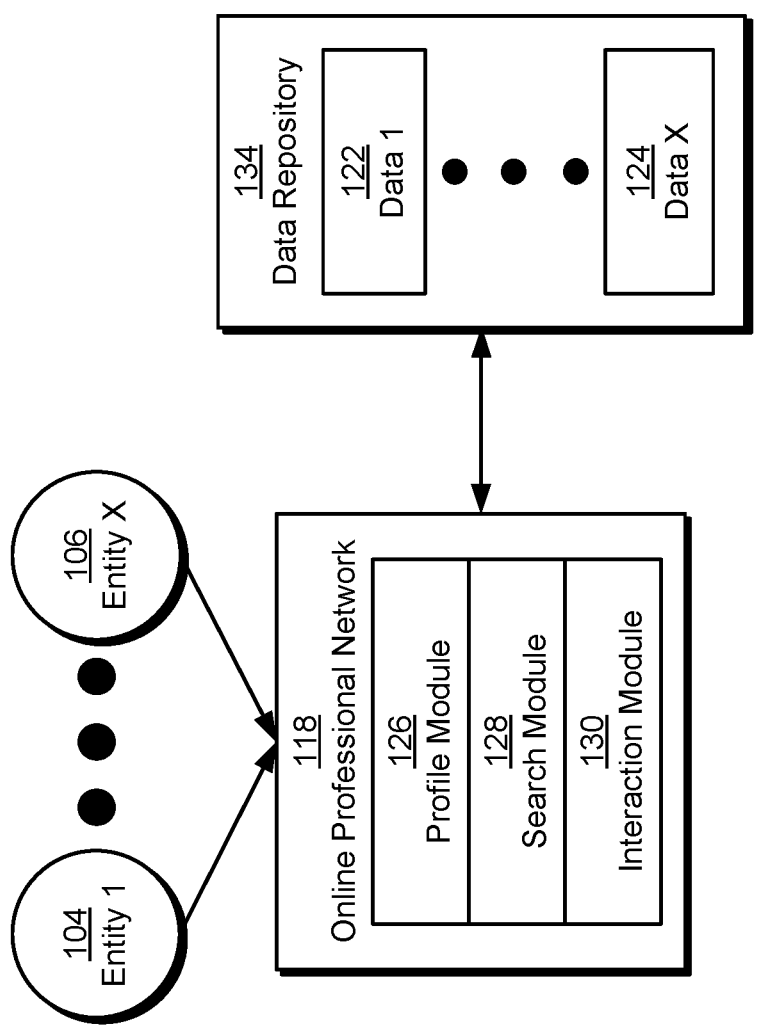
FIG. 1 shows a schematic of a system in accordance with the disclosed embodiments.

The disclosed embodiments provide a method, apparatus, and system for processing data. As shown in FIG. 1, the data may be associated with a user community, such as an online professional network 118 that is used by a set of entities (e.g., entity 1 104, entity x 106) to interact with one another in a professional and/or business context.

The entities may include users that use online professional network 118 to establish and maintain professional connections, list work and community experience, endorse and/or recommend one another, search and apply for jobs, and/or perform other actions. The entities may also include companies, employers, and/or recruiters that use online professional network 118 to list jobs, search for potential candidates, provide business-related updates to users, advertise, and/or take other action.

More specifically, online professional network 118 includes a profile module 126 that allows the entities to create and edit profiles containing information related to the entities' professional and/or industry backgrounds, experiences, summaries, job titles, projects, skills, and so on. Profile module 126 may also allow the entities to view the profiles of other entities in online professional network 118.

Profile module 126 may also include mechanisms for assisting the entities with profile completion. For example, profile module 126 may suggest industries, skills, companies, schools, publications, patents, certifications, and/or other types of attributes to the entities as potential additions to the entities' profiles. The suggestions may be based on predictions of missing fields, such as predicting an entity's industry based on other information in the entity's profile. The suggestions may also be used to correct existing fields, such as correcting the spelling of a company name in the profile. The suggestions may further be used to clarify existing attributes, such as changing the entity's title of "manager" to "engineering manager" based on the entity's work experience.

Online professional network 118 also includes a search module 128 that allows the entities to search online professional network 118 for people, companies, jobs, and/or other job- or business-related information. For example, the entities may input one or more keywords into a search bar to find profiles, job postings, articles, and/or other information that includes and/or otherwise matches the keyword(s). The entities may additionally use an "Advanced Search" feature in online professional network 118 to search for profiles, jobs, and/or information by categories such as first name, last name, title, company, school, location, interests, relationship, skills, industry, groups, salary, experience level, etc.

Online professional network 118 further includes an interaction module 130 that allows the entities to interact with one another on online professional network 118. For example, interaction module 130 may allow an entity to add other entities as connections, follow other entities, send and receive emails or messages with other entities, join groups, and/or interact with (e.g., create, share, re-share, like, and/or comment on) posts from other entities.

Those skilled in the art will appreciate that online professional network 118 may include other components and/or modules. For example, online professional network 118 may include a homepage, landing page, and/or content feed that provides the latest posts, articles, and/or updates from the entities' connections and/or groups to the entities. Similarly, online professional network 118 may include features or mechanisms for recommending connections, job postings, articles, and/or groups to the entities.

In one or more embodiments, data (e.g., data 1 122, data x 124) related to the entities' profiles and activities on online professional network 118 is aggregated into a data repository 134 for subsequent retrieval and use. For example, each profile update, profile view, connection, follow, post, comment, like, share, search, click, message, interaction with a group, address book interaction, response to a recommendation, purchase, and/or other action performed by an entity in online professional network 118 may be tracked and stored in a database, data warehouse, cloud storage, and/or other data-storage mechanism providing data repository 134.

In turn, data in data repository 134 may be used to generate recommendations and/or other insights related to listings of jobs or opportunities within online professional network 118. For example, one or more components of the online professional network may track searches, clicks, views, text input, conversions, and/or other feedback during the entities' interaction with a job search tool in the online professional network. The feedback may be stored in data repository 134 and used as training data for one or more machine learning models, and the output of the machine learning model(s) may be used to display and/or otherwise recommend a number of job listings to current or potential job seekers in the online professional network.

More specifically, data in data repository 134 and one or more machine learning models are used to produce rankings of candidates for jobs or opportunities listed within or outside online professional network 118. The candidates may include users who have viewed, searched for, or applied to jobs, positions, roles, and/or opportunities, within or outside online professional network 118. The candidates may also, or instead, include users and/or members of online professional network 118 with skills, work experience, and/or other attributes or qualifications that match the corresponding jobs, positions, roles, and/or opportunities.

After the candidates are identified, profile and/or activity data of the candidates may be inputted into the machine learning model(s), along with features and/or characteristics of the corresponding opportunities (e.g., required or desired skills, education, experience, industry, title, etc.). In turn, the machine learning model(s) may output scores representing the strength of the candidates with respect to the opportunities and/or qualifications related to the opportunities (e.g., skills, current position, previous positions, overall qualifications, etc.). For example, the machine learning model(s) may generate scores based on similarities between the candidates' profile data with online professional network 118 and descriptions of the opportunities. The model(s) may further adjust the scores based on social and/or other validation of the candidates' profile data (e.g., endorsements of skills, recommendations, accomplishments, awards, etc.). The rankings may then be generated by ordering the candidates in descending order of score.

In turn, the rankings and/or associated insights may improve the quality of the candidates and/or recommendations of opportunities to the candidates, increase user activity with online professional network 118, and/or guide the decisions of the candidates and/or moderators involved in screening for or placing the opportunities (e.g., hiring managers, recruiters, human resources professionals, etc.). For example, one or more components of online professional network 118 may display and/or otherwise output a member's position (e.g., top 10%, top 20 out of 138, etc.) in a ranking of candidates for a job to encourage the member to apply for jobs in which the member is highly ranked. In a second example, the component(s) may account for a candidate's relative position in rankings for a set of jobs during ordering of the jobs as search results in response to a job search by the candidate. In a third example, the component(s) may recommend highly ranked candidates for a position to recruiters and/or other moderators as potential applicants and/or interview candidates for the position.

On the other hand, calls to downstream services and/or other processing required to generate the rankings may significantly increase the latency of requests for the rankings and/or load on the downstream services. For example, each request for a ranking of candidates for an opportunity and/or a specific candidate's position in the ranking may require multiple calls to data stores or services that identify candidates for the opportunity, provide features related to the candidates and opportunity, and apply machine learning models to the features to produce a score for each candidate-opportunity pair. Requests for rankings may also be processed independently of one another, resulting in a large number of calls and/or significant computation to generate a response to each request. In other words, each request for a ranking of candidates for an opportunity may generate multiple additional requests for data and/or computation from downstream services, as well as additional latency and/or overhead associated with processing of the requests by the downstream services.

Figure 2:
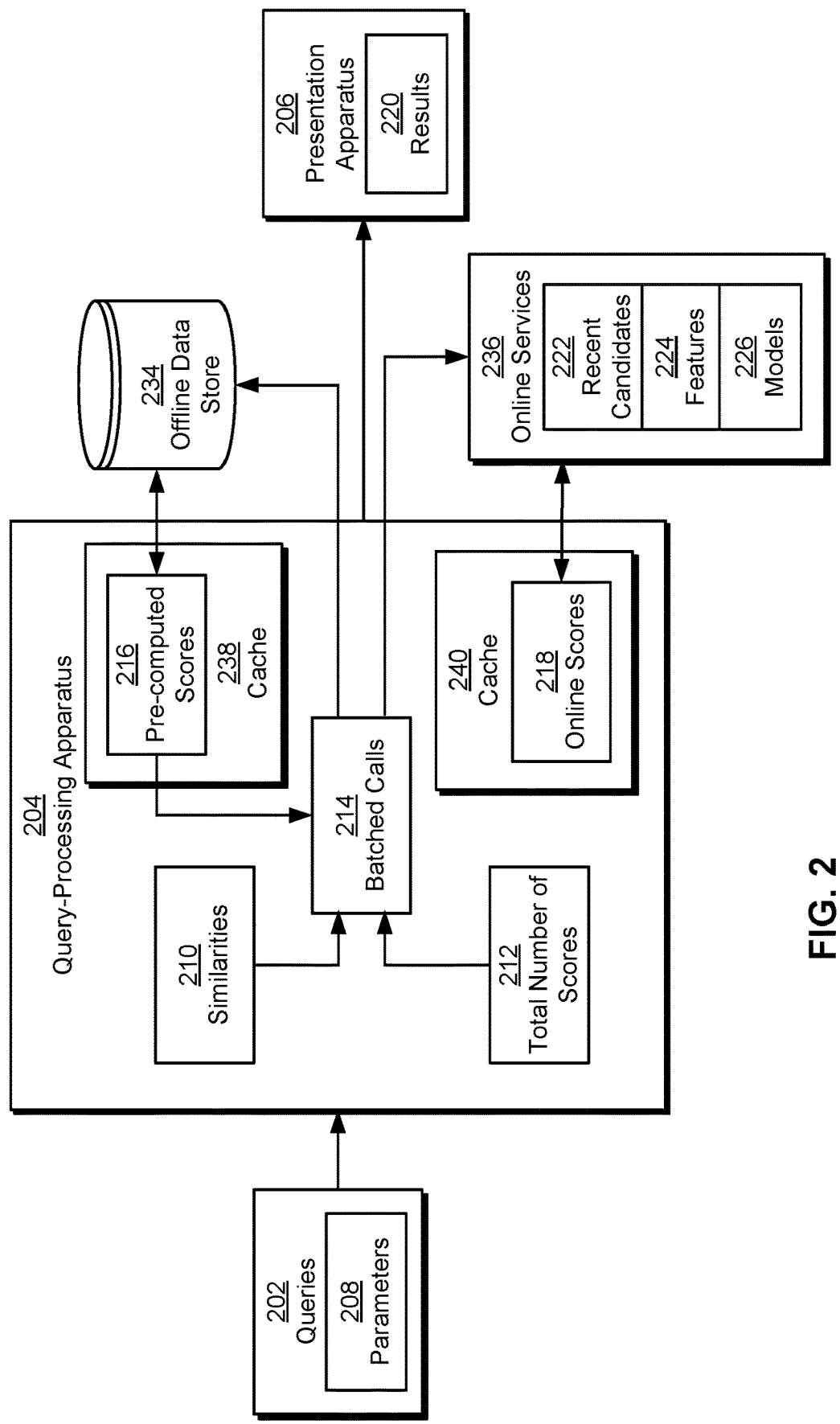
FIG. 2 shows a system for processing a query for a ranking of candidates for an opportunity in accordance with the disclosed embodiments.

In one or more embodiments, one or more components of online professional network 118 include functionality to process queries for rankings of candidates for opportunities in an efficient, scalable way. As shown in FIG. 2, queries 202 related to rankings of candidates for opportunities are received by a query-processing apparatus 204. For example, queries 202 may be used to generate results 220 that include, but are not limited to, scores representing the strength or "fit" of the candidates with respect to the opportunities, rankings of the candidates by the scores, and/or percentiles or positions of the candidates in the rankings. As a result, query-processing apparatus 204 may include a service that produces results 220 in a real-time or nearline basis in response to queries 202 for the corresponding rankings.

Queries 202 may be received from one or more components of a social network (e.g., online professional network 118 of FIG. 1), an employment website or service, and/or another application or service that can be used to search for, view, obtain recommendations for, and/or apply for jobs or opportunities. For example, queries 202 may be generated by components for displaying job recommendations, job search results, and/or job listings to users that are candidates for the jobs. Alternatively, queries 202 may be received from components and/or services that are used to evaluate the strengths of the candidates for the jobs.

Queries 202 include parameters 208 that are used to generate the corresponding results 220. For example, each query may specify parameters 208 such as one or more candidates to be ranked and one or more opportunities by which the candidates are to be ranked. The query may additionally identify a ranking category used to rank the candidates for the opportunities, such as skills associated with the opportunities, the previous positions of the candidates, the current positions of the candidates, and/or the candidates' overall qualifications for the opportunities (e.g., a combination of skills, previous positions, current positions, and/or other attributes or qualifications under consideration).

After queries 202 are received, query-processing apparatus 204 uses a number of techniques to reduce latency and/or overhead associated with processing queries 202. First, query-processing apparatus 204 identifies similarities 210 among queries 202. Similarities 210 may be based on a common candidate and/or a common opportunity in parameters 208 of queries 202 (e.g., the same candidate for multiple opportunities or multiple candidates for the same opportunity). Similarities 210 may also extend to a group of related rankings, such as rankings of candidates by skills, past positions, current positions, and/or overall qualifications for the same opportunity. Similarities 210 may further extend to overlap in candidates for similar opportunities (e.g., software engineering jobs at companies of the same industry, size, and/or location). In general, similarities 210 may relate to commonality or overlap in parameters 208 and/or entities or records retrieved in response to parameters 208 (e.g., candidates, opportunities, etc.).

Similarities 210 may be identified for a series or combination of queries 202 received over a given period (e.g., a number of seconds). For example, a frontend component may generate a batch of related queries 202 for rankings containing a candidate when the candidate searches or browses for job listings for which the rankings are to be generated. Alternatively, similarities 210 may be used to generate and/or group queries 202 during batch processing related to multiple candidates and opportunities, such as offline generation of job recommendations for a large number of job seekers or potential job seekers.

Next, query-processing apparatus 204 uses similarities 210 to generate batched calls 214 for retrieving and/or calculating scores that are used to produce results 220. For example, query-processing apparatus 204 may group queries 202 by opportunities for a given candidate, candidates for a given opportunity, ranking categories for a given candidate and/or opportunity, and/or other parameters 208 or attributes that result in significant overlap in data and/or computations used to generate the corresponding results 220. Query-processing apparatus 204 may then batch downstream calls that are used to generate results 220 of the grouped queries 202 to reduce redundancy in retrieving data and/or performing computations related to processing the downstream calls.

Query-processing apparatus 204 may also optimize batched calls 214 in a way that balances the tradeoff between the accuracy of results 220 and the latency and/or overhead required to generate results 220. In particular, query-processing apparatus 204 makes some batched calls 214 to an offline data store 234 that contains pre-computed scores 216 for candidate-opportunity pairs. For example, offline data store 234 may include scores that are calculated on a periodic (e.g., daily) basis by one or more batch-processing jobs, with each score representing the strength of a given candidate with respect to a particular opportunity. Thus, pre-computed scores 216 in offline data score 234 may be calculated for a set of candidate-opportunity pairs, with each candidate-opportunity pair representing a known candidate for a particular opportunity (e.g., a user who has applied for a job, viewed the job, received the job as a recommendation, and/or received the job as a search result).

Query-processing apparatus 204 also makes additional batched calls 214 to one or more online services 236 that are used to generate online scores 218 for more recent candidates or applicants for the opportunities. Online services 236 may include a service that identifies recent candidates 222 for an opportunity on a real-time or nearline basis. As a result, the service may provide a more up-to-date and/or comprehensive list of candidates than the set of candidates associated with pre-computed scores 216 for the opportunity from offline data store 234.

Online services 236 may also include a service that provides features 224 for the candidates and opportunities on a real-time or nearline basis. For example, the service may include an online and/or nearline data store that provides the latest versions of skills, titles, education, and/or work experience associated with the candidates and opportunities.

Online services 236 may further include a service that applies one or more machine learning models 226 to the features to generate a set of online scores 218 for candidate-opportunity pairs represented by the features. For example, models 226 may include logistic regression models, artificial neural networks, and/or other types of models that calculate, for features associated with a given candidate-opportunity pair, scores representing the strength of the candidates with respect to the corresponding opportunities. Consequently, query-processing apparatus 204 may obtain online scores 218 only after making a series of calls to multiple downstream services to identify candidates 222 for the jobs, obtain features 224 for the candidates and jobs, and execute machine learning models 226 using the features.

Because pre-computed scores 216 can be retrieved using simple lookups of offline data store 234 instead of a series of calls for retrieving data and performing calculations to generate the scores, query-processing apparatus 204 may reduce latency and/or system load by increasing the use of slightly older pre-computed scores 216 and reducing the use of more up-to-date online scores 218 in processing queries 202 and producing results 220. First, query-processing apparatus 204 uses one or more batched calls 214 to retrieve, from offline data store 234, all available pre-computed scores 216 that match parameters 208 of a group of similar queries 202. For example, query-processing apparatus 204 may use a batched call to offline data store 234 to obtain the latest set of pre-computed scores 216 that have been computed for all candidates of a set of related opportunities.

Next, for each query in the group, query-processing apparatus 204 determines the number of online scores 218 to produce based on a difference between the number of pre-computed scores 216 available for use in generating the corresponding ranking and a total number of scores 212 needed to generate the ranking. For example, total number of scores 212 may be set to a value (e.g., 100, 150, 200, etc.) that produces substantially accurate rankings and/or results 220 in response to queries 202. If the number of pre-computed scores 216 falls below total number of scores 212, query-processing apparatus 204 may select the number of online scores 218 so that total number of scores 212 is reached. If the number of pre-computed scores 216 equals or exceeds total number of scores 212, query-processing apparatus 204 may omit the generation and use of online scores 218 in producing the ranking. In another example, query-processing apparatus 204 may select minimum and/or maximum numbers of pre-computed scores 216 and/or online scores 218 used to generate the ranking based on the load on the system, requirements associated with the accuracy or recency of results 220, and/or other considerations.

Query-processing apparatus 204 then generates the determined number of online scores 218 by making batched calls 214 to the corresponding online services 236. For example, query-processing apparatus 204 may generate batched calls 214 to identify recent candidates 222 that have surfaced since pre-computed scores 216 were calculated, obtain features 224 for the candidates and corresponding opportunities identified in the corresponding grouped queries 202, and use one or more machine learning models 226 to calculate the specified number of online scores 218 from the features. At a minimum, query-processing apparatus 204 may calculate an online score for each candidate and opportunity identified in parameters 208 of each query (e.g., the candidate for which a position or percentile in the ranking is to be calculated with respect to other candidates for the opportunity).

To further streamline processing and/or reduce system latency and/or system load associated with batched calls 214 for producing online scores 218, query-processing apparatus 204 may select recent candidates 222 that are common to multiple queries 202 and perform subsequent retrieval of features 224 and model-based scoring using the candidates. For example, query-processing apparatus 204 may identify, for a grouping of similar queries 202, candidates that are included in the rankings for two or more queries 202. Query-processing apparatus 204 may then generate batched calls 214 to maximize the retrieval of features for the candidates and reduce the retrieval of features for candidates that are included in the rankings of individual queries 202, thereby reducing the amount of processing and/or data required to obtain features 224 that are subsequently used to generate online scores 218.

Query-processing apparatus 204 also tunes batch sizes associated with batched calls 214 based on latencies associated with processing batched calls 214 by offline data store 234 and/or online services 236. For example, query-processing apparatus 204 may control and/or balance batching and/or parallelizing of calls to offline data store 234 and/or online services 236 so that the latency of processing the calls is reduced. Such batching and parallelizing may be tailored to the design and/or characteristics of individual services (e.g., offline data store 234, online services 236, etc.) involved in processing batched calls 214. For example, a different batch size and/or fan-out may be selected for each service called by query-processing apparatus 204 to obtain and/or produce pre-computed scores 216 and online scores 218 in a way that minimizes latency at that service.

After pre-computed scores 216 and online scores 218 are obtained or produced for candidate-job pairs associated with one or more similar queries 202, query-processing apparatus 204 uses the scores to generate results 220 of queries 202. For example, query-processing apparatus 204 may generate a ranking for each query by ordering candidates for a given opportunity by ascending or descending order of scores, which may include pre-computed scores 216 and/or online scores 218. Query-processing apparatus 204 may then calculate the position or percentile of one or more candidates in the ranking and include the scores, ranking, position, and/or percentile in results 220 for the query.

Results 220 are then outputted by a presentation apparatus 206. For example, presentation apparatus 206 may include one or more frontend components and/or batch-processing jobs that generate queries 202 in response to activity from job seekers and/or other users identified as candidates for the opportunities. Presentation apparatus 206 may obtain results 220 from query-processing apparatus 204 and include insights related to results 220 (e.g., "You'd be in the top 10% of 232 applicants for this job," "You'd be in the top 5 applicants for this job," "This member is in the top 25% of candidates for this position," etc.) in recommendations, search results, job listings, and/or other output associated with the opportunities. The output may be included in emails, notifications, user-interface elements, tables, files, visualizations, and/or other mechanisms for communicating or interacting with the candidates.

Query-processing apparatus 204 further reduces processing and/or latency associated with subsequent queries 202 by storing data used to process previous queries in a number of caches 238-240. For example, query-processing apparatus 204 may store pre-computed scores 216 retrieved from offline data store 234 in an in-memory cache 238. Query-processing apparatus 204 may also store online scores 218 and/or associated data (e.g., recent candidates 222, features 224, models 226, etc.) from online services 236 in a separate in-memory cache 240. In turn, data in caches 238-240 may be used in lieu of batched calls 214 to process queries 202 when the data is available and matches parameters 208 of queries 202.

Each set of data in caches 238-240 may be associated with a time to live (TTL) that reflects the frequency with which the data is updated. For example, TTLs for pre-computed scores 216 in cache 238 may be set to a number of hours to ensure that the latest pre-computed scores 216 from the previous day are used to process queries 202. In another example, TTLs for real-time or nearline lists of recent candidates 222 for opportunities may be set to a relatively short period (e.g., 15-20 minutes) to ensure that the lists are substantially up to date. In a third example, TTLs for features 224 associated with recent candidates 222 may be shorter than TTLs for features 224 associated with the corresponding opportunities to reflect the different rates at which user data and job listing data change. After the TTL for a given set of cached data has lapsed, query-processing apparatus 204 may use batched calls 214 to retrieve newer versions of the data from offline data store 234 and/or online services 236 and replace the cached data with the newer versions.

On the other hand, cached and/or older data may be used to process queries 202 when batched calls 214 cannot be used to retrieve pre-computed scores 216 from offline data store 234 and/or generate online scores 218, even when the corresponding TTLs have lapsed. For example, pre-computed scores 216 from offline data store 234 and/or stale data in caches 238-240 may be used to generate rankings and/or results 220 of queries 202 when one or more batched calls 214 to online services 236 fail. Along the same lines, pre-computed scores 216 from cache 238 and/or previously calculated online scores 218 from cache 240 may be used to generate rankings or results 220 of queries 202 during an outage in offline data store 234. The cached scores may optionally be supplemented by additional batched calls 214 to online services 236 when online services 236 are available. Consequently, query-processing apparatus 204 may use stale data in caches 238-240 as a fallback for generating results 220 during a lack of availability in offline data store 234 and/or one or more online services 236.

Similarly, query-processing apparatus 204 may generate rankings and/or results 220 even when the combined number of pre-computed scores 216 and online scores 218 does not meet total number of scores 212. For example, a relative small number of pre-computed scores 216 and/or online scores 218 may exist for a given opportunity when the opportunity is newly listed and/or applicable to a small number of candidates. In turn, the number of scores used to generate rankings and/or results 220 may be returned with the rankings and/or results 220 in response to the corresponding queries 202 to allow the components from which queries 202 were received to determine the validity or usefulness of the rankings and/or results 220.

By batching calls for related and/or similar queries 202 to downstream services, increasing the use of pre-computed scores 216 over the calculation of online scores 218, and caching scores used to generate results 220 of previous queries 202 for use in processing subsequent queries 202, the system of FIG. 2 may reduce latency and/or load associated with processing queries 202 of rankings of candidates for opportunities. Consequently, the disclosed embodiments may improve the performance, efficiency, speed, and/or scalability of query-processing technologies and/or computer systems on which the query-processing technologies execute.

Figure 3:
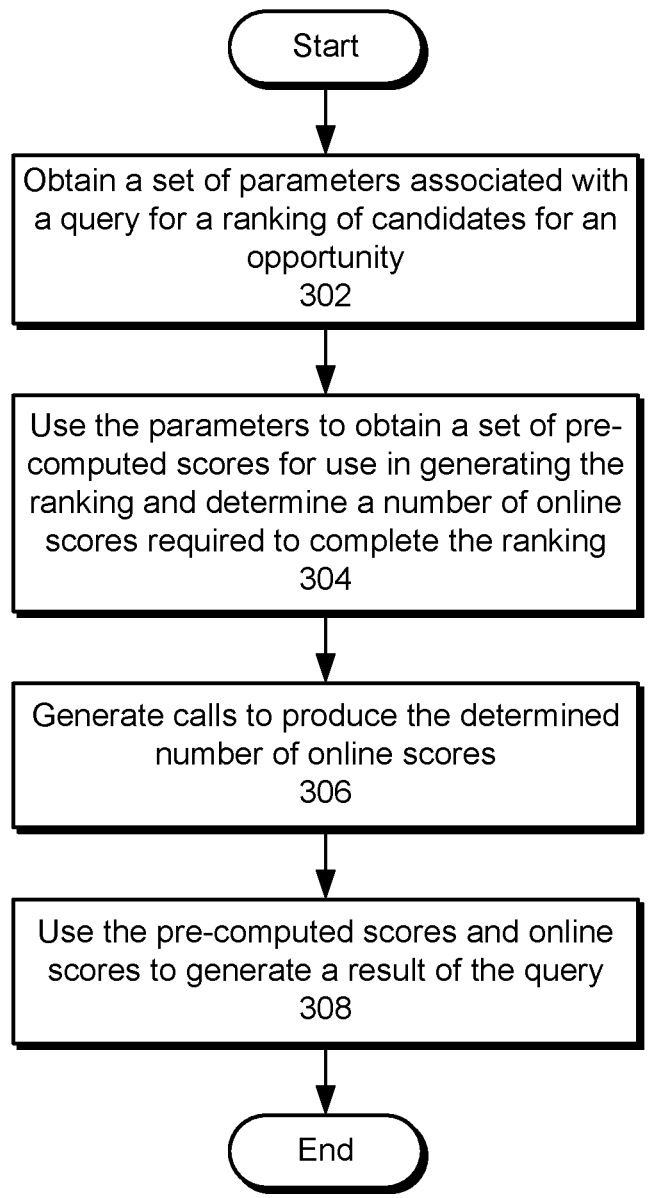
FIG. 3 shows a flowchart illustrating the processing of a query for a ranking of candidates for an opportunity in accordance with the disclosed embodiments.

FIG. 3 shows a flowchart illustrating the processing of a query for a ranking of candidates for an opportunity in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the technique.

Initially, a set of parameters associated with a query for a ranking of candidates for an opportunity is obtained (operation 302). For example, the parameters may be included in the query by a frontend component and/or batch-processing job that uses the ranking to make recommendations, display insights, and/or otherwise guide user behavior related to job seeking or placement of opportunities. The parameters may specify a candidate, an opportunity, and/or a ranking category (e.g., overall ranking, skills-based ranking, ranking based on previous positions of the candidate, ranking based on a current position of the candidate, etc.) for which the ranking is to be generated.

Next, the parameters are used to obtain a set of pre-computed scores for use in generating the ranking and determine a number of online scores required to complete the ranking (operation 304). For example, the parameters may be included in a call to an offline data store containing the pre-computed scores, or the parameters may be matched to pre-computed scores from cached results of a previous call to the offline data store. The number of online scores to generate may then be determined based on a difference between a number of pre-computed scores and a total number of scores used to generate the ranking. Thus, if the number of pre-computed scores is less than the total number of scores needed to generate the ranking, the number of online scores may be selected to make up for the difference.

Calls are then generated to produce the determined number of online scores (operation 306). For example, the calls may include a first call to identify a set of recent candidates for the opportunity (e.g., candidates that have been identified since the last set of pre-computed scores was calculated), a second call to obtain features for the recent candidates, and a third call to calculate, by a machine learning model from the features, the online scores for the recent candidates. Calls to retrieve the pre-computed scores and/or calculate the online scores may also be batched and/or parallelized to reduce additional overhead and/or latency associated with duplicate data retrieval and/or processing from calls used to process related queries, as described in further detail below with respect to FIG. 4.

Finally, the pre-computed scores and online scores are used to generate a result of the query (operation 308). For example, the pre-computed scores and online scores may be used to rank the candidates by the scores for each opportunity and calculate the position and/or percentile of one or more candidates in each ranking. The position, percentile, and/or related insights (e.g., "You are in the top 10% of candidates for this job") may then be included in a job viewed by the candidates, a job recommended to the candidate, a job in search results for the candidate's job search, and/or a recommendation of the candidate to a recruiter, human resources professional, and/or other moderator involved in placing the job.

Figure 4:
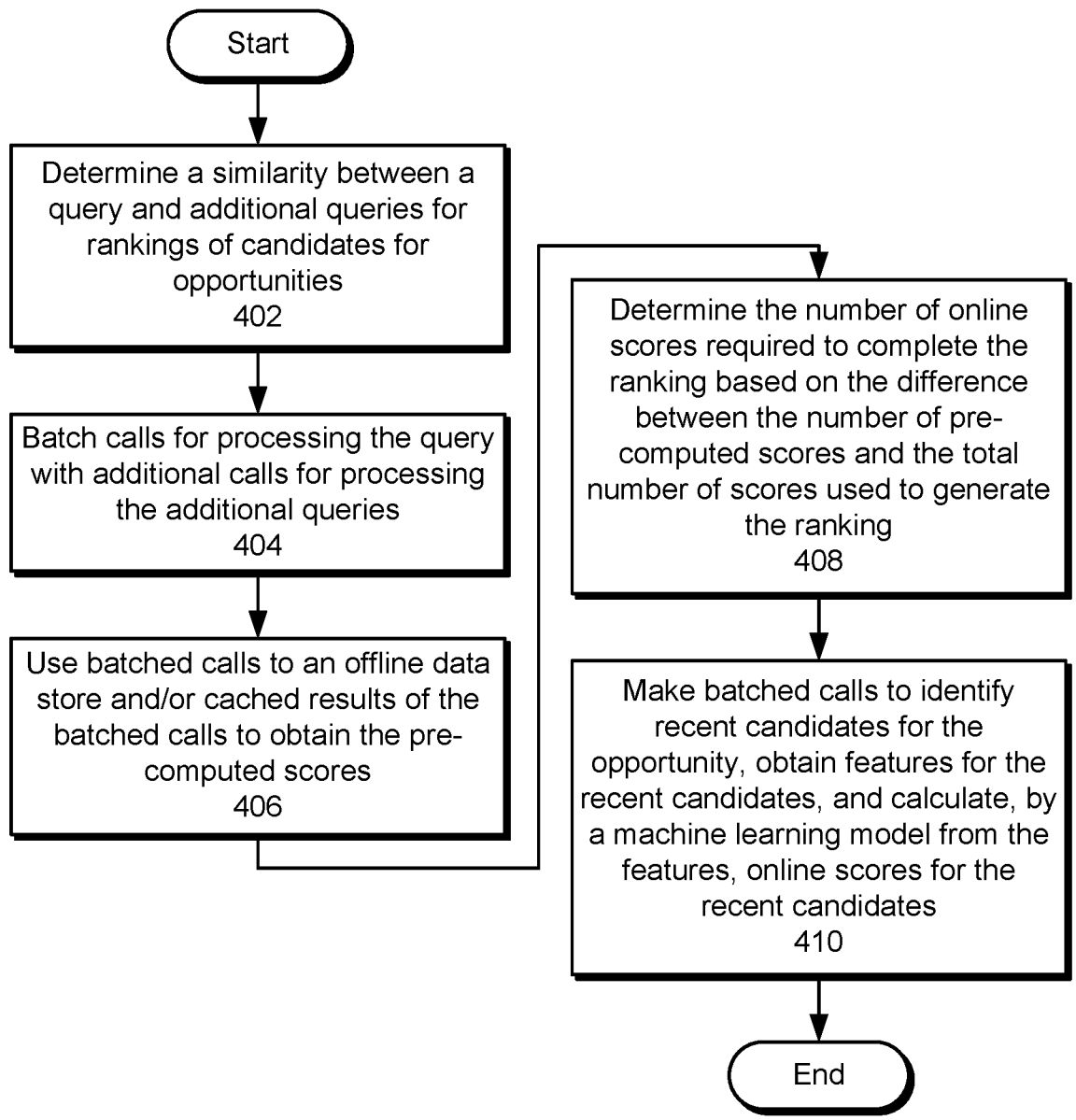
FIG. 4 shows a flowchart illustrating a process of obtaining scores used to generate a ranking of candidates for an opportunity in accordance with the disclosed embodiments.

FIG. 4 shows a flowchart illustrating a process of obtaining scores used to generate a ranking of candidates for an opportunity in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the technique.

First, a similarity between a query and additional queries for rankings of candidates for opportunities is determined (operation 402). For example, the similarity may be based on a candidate shared by the queries, an opportunity shared by the queries, a set of common candidates and/or opportunities associated with the queries (e.g., overlapping candidates for similar jobs and/or similar jobs for the same candidate), and/or a set of related rankings (e.g., rankings of candidates for the same opportunity by skills, past positions, current positions, and/or overall qualifications).

Next, calls for processing the query are batched with additional calls for processing the additional queries (operation 404). For example, the calls may be batched according to similarities and/or overlap in parameters among the queries and/or an interval in which the queries were received.

Batched calls made to an offline data store and/or cached results of the batched calls are then used to obtain pre-computed scores (operation 406) for use in generating the ranking. For example, the pre-computed scores may be obtained from the cached results within a TTL associated with the cached results and/or when the call to the offline data store fails.

The number of online scores required to complete the ranking is then determined based on the difference between the number of pre-computed scores and the total number of scores used to generate the ranking (operation 408), as discussed above. Batched calls are then made to identify recent candidates for the opportunity, obtain features for the recent candidates, and calculate, by a machine learning model from the features, online scores for the recent candidates (operation 410). For example, the batched calls may be made to different online data stores and/or services with different latencies, designs, and/or characteristics. As a result, the batched calls may be produced and/or parallelized according to the similarities in the corresponding parameters and/or to reduce latency associated with processing the calls by the data stores and/or services. Pre-computed scores and online scores received in response to the batched calls may then be used to generate the ranking, as discussed above.

Figure 5:
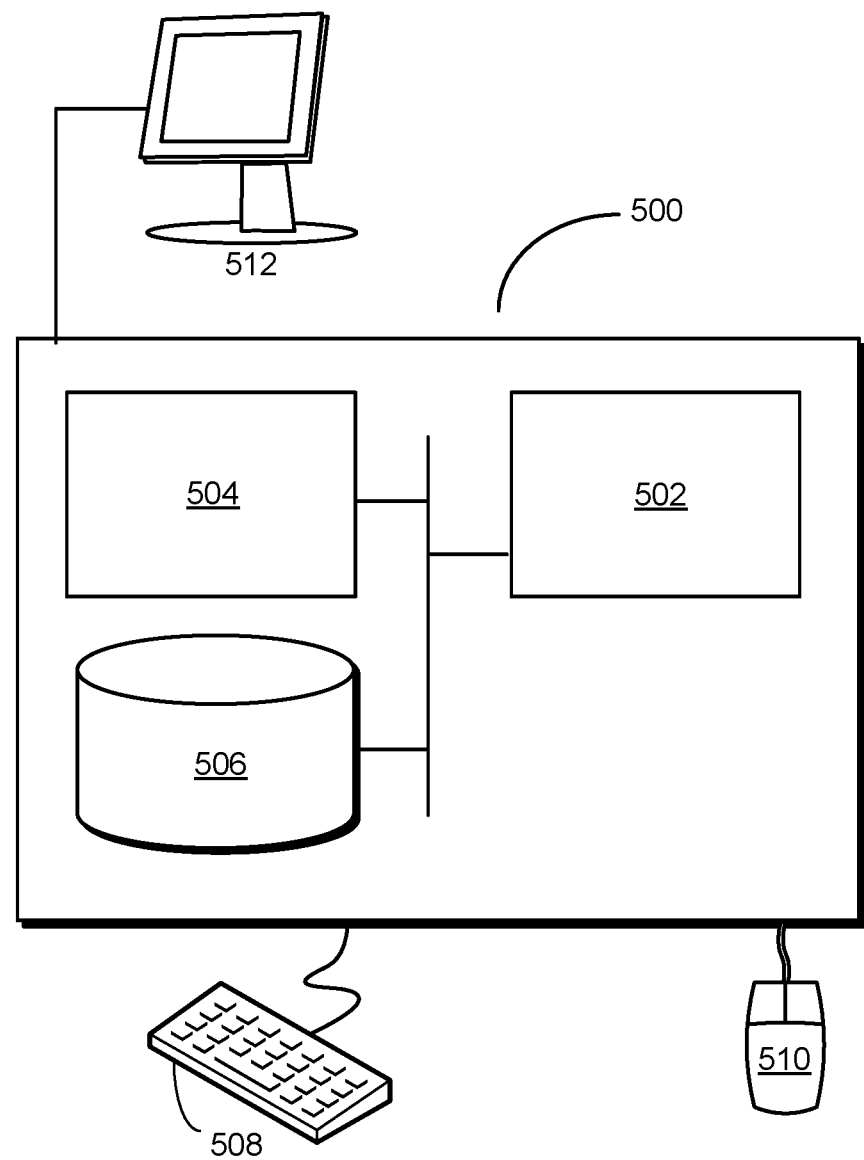
FIG. 5 shows a computer system in accordance with the disclosed embodiments.

FIG. 5 shows a computer system 500 in accordance with the disclosed embodiments. Computer system 500 includes a processor 502, memory 504, storage 506, and/or other components found in electronic computing devices. Processor 502 may support parallel processing and/or multi-threaded operation with other processors in computer system 500. Computer system 500 may also include input/output (I/O) devices such as a keyboard 508, a mouse 510, and a display 512.

Computer system 500 may include functionality to execute various components of the present embodiments. In particular, computer system 500 may include an operating system (not shown) that coordinates the use of hardware and software resources on computer system 500, as well as one or more applications that perform specialized tasks for the user. To perform tasks for the user, applications may obtain the use of hardware resources on computer system 500 from the operating system, as well as interact with the user through a hardware and/or software framework provided by the operating system.

In one or more embodiments, computer system 500 provides a system for processing a query for a ranking of candidates for an opportunity. The system includes a query-processing apparatus and a presentation apparatus, one or more of which may alternatively be termed or implemented as a module, mechanism, or other type of system component. The query-processing apparatus obtains a set of parameters associated with a query for a ranking of candidates for an opportunity. Next, the query-processing apparatus uses the set of parameters to obtain a set of pre-computed scores for use in generating the ranking and determine a number of online scores required to complete the ranking. The query-processing apparatus then generates a set of calls to produce the determined number of the online scores. Finally, the query-processing apparatus uses the pre-computed scores and the online scores to generate a result of the query, and the presentation apparatus outputs the result to the candidate.

In addition, one or more components of computer system 500 may be remotely located and connected to the other components over a network. Portions of the present embodiments (e.g., query-processing apparatus, presentation apparatus, online professional network, etc.) may also be located on different nodes of a distributed system that implements the embodiments. For example, the present embodiments may be implemented using a cloud computing system that processes queries for rankings of a set of remote candidates for opportunities.

By configuring privacy controls or settings as they desire, members of a social network, online professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method, comprising:
  calculating a plurality of pre-computed scores for ranking candidate-opportunity pairs, each pre-computed score representing a strength of the candidate with respect to the opportunity;
  detecting a query to find candidates for an opportunity;
  obtaining a set of parameters associated with the query for ranking candidates for the opportunity, the set of parameters comprising the opportunity and a ranking category identifying one or more candidate requirements for the opportunity;
  selecting, based on the set of parameters, by a computer system, a set of pre-computed scores for candidates, from the plurality of pre-computed scores, for use in generating the ranking;
  determining a number of online scores for additional candidates required to complete the ranking based on the selected set of pre-computed scores for candidates;
  generating, by the computer system, in response to the number of scores being greater than zero, a set of calls to produce, at least, the determined number of the online scores for additional candidates; and
  using the pre-computed scores and the online scores to generate a result of the query.

2. The method of claim 1, wherein selecting the set of pre-computed scores comprises:
  including the set of parameters in a call to a data store comprising the plurality of pre-computed scores; and
  obtaining the pre-computed scores in response to the call.

3. The method of claim 2, wherein obtaining the pre-computed scores comprises at least one of:
  obtaining the pre-computed scores from cached results within a predefined time to live (TTL); and
  obtaining the pre-computed scores from the data store of pre-computed scores when the cached results are not available.

4. The method of claim 1, wherein determining the number of online scores comprises:
  determining the number of online scores based on a difference between a number of the pre-computed scores for candidates and a total number of scores used to generate the ranking.

5. The method of claim 1, wherein generating the set of calls to produce the determined number of the online scores comprises:
  making a first call to identify a set of recent candidates for the opportunity;
  making a second call to obtain features for the recent candidates; and
  making a third call to calculate, by a machine learning model utilizing the features, the online scores for the set of recent candidates.

6. The method of claim 1, wherein generating the set of calls to produce the determined number of the online scores comprises:
  determining a similarity between the query and one or more additional queries for rankings of candidates for opportunities; and
  batching the set of calls with an additional set of calls for processing the one or more additional queries.

7. The method of claim 6, wherein the similarity is calculate based at least one of:
  the candidate;
  the opportunity;
  a set of common candidates;
  a set of common opportunities; and
  a set of related rankings.

8. The method of claim 6, wherein batching the set of calls with the additional set of calls comprises:
  tuning a batch size associated with batching the set of calls and the additional set of calls based on a latency associated with processing the set of calls and the additional set of calls.

9. The method of claim 1, wherein the result of the query is associated with a candidate search for the opportunity.

10. The method of claim 1, wherein the result of the query comprises a ranking of the candidates for the opportunity based on the ranking category.

11. The method of claim 1, wherein the ranking category is at least one of:
  an overall ranking based on a profile of the candidate;
  a skills-based ranking;
  a ranking based on previous positions of the candidate; and
  a ranking based on a current position of the candidate.

12. A system, comprising:
  one or more processors; and
  memory storing instructions that, when executed by the one or more processors, cause the system to:
    calculate a plurality of pre-computed scores for ranking candidate-opportunity pairs, each pre-computed score representing a strength of the candidate with respect to the opportunity;
    detect a query to find candidates for an opportunity;
    obtain a set of parameters associated with the query for ranking candidates for the opportunity, the set of parameters comprising the opportunity and a ranking category identifying one or more candidate requirements for the opportunity;
    selecting, based on the set of parameters, by a computer system, a set of pre-computed scores for candidates, from the plurality of pre-computed scores, for use in generating the ranking;
    determine a number of online scores for additional candidates required to complete the ranking based on the selected set of pre-computed scores for candidates;
    generate, in response to the number of scores being greater than zero, a set of calls to produce, at least, the determined number of the online scores for additional candidates; and
    use the pre-computed scores and the online scores to generate a result of the query.

13. The system of claim 12, wherein selecting the set of pre-computed scores available comprises:
  including the set of parameters in a call to a data store comprising the plurality of pre-computed scores; and
  obtaining the pre-computed scores in response to the call.

14. The system of claim 13, wherein obtaining the pre-computed scores comprises at least one of:
  obtaining the pre-computed scores from cached results within a predefined time to live (TTL); and
  obtaining the pre-computed scores from the data store of pre-computed scores when the cached results are not available.

15. The system of claim 12, wherein determining the number of online scores comprises:
  determining the number of online scores based on a difference between a number of the pre-computed scores for candidates and a total number of scores used to generate the ranking.

16. The system of claim 12, wherein generating the set of calls to produce the determined number of the online scores comprises:
  making a first call to identify a set of recent candidates for the opportunity;
  making a second call to obtain features for the recent candidates; and
  making a third call to calculate, by a machine learning model utilizing the features, the online scores for the set of recent candidates.

17. The system of claim 12, wherein generating the set of calls to produce the determined number of the online scores comprises:
  determining a similarity between the query and one or more additional queries for rankings of candidates for opportunities; and
  batching the set of calls with an additional set of calls for processing the one or more additional queries.

18. The system of claim 17, wherein the similarity is calculate based at least one of:
  the candidate;
  the opportunity;
  a set of common candidates;
  a set of common opportunities; and
  a set of related rankings.

19. The system of claim 12, wherein the ranking category is at least one of:
  an overall ranking based on a profile of the candidate;
  a skills-based ranking;
  a ranking based on previous positions of the candidate; and
  a ranking based on a current position of the candidate.

20. A non-transitory computer-readable storage medium storing instructions that when executed by a computer cause the computer to perform a method, the method comprising:
  calculating a plurality of pre-computed scores for ranking candidate-opportunity pairs, each pre-computed score representing a strength of the candidate with respect to the opportunity;

detecting a query to find candidates for an opportunity;

obtaining a set of parameters associated with the query for ranking candidates for the opportunity, the set of parameters comprising the opportunity and a ranking category identifying one or more candidate requirements for the opportunity;

selecting, based on the set of parameters, a set of pre-computed scores for candidates, from the plurality of pre-computed scores, for use in generating the ranking;

determining a number of online scores for additional candidates required to complete the ranking based on the selected set of pre-computed scores for candidates;

generating, in response to the number of scores being greater than zero, a set of calls to produce, at least, the determined number of the online scores for additional candidates; and using the pre-computed scores and the online scores to generate a result of the query.

* * * * *